(12) United States Patent
Klein et al.

(10) Patent No.: US 11,698,729 B2
(45) Date of Patent: *Jul. 11, 2023

(54) SYSTEM AND METHOD FOR REDUCED SSD FAILURE VIA ANALYSIS AND MACHINE LEARNING

(71) Applicant: Kioxia Corporation, Tokyo (JP)

(72) Inventors: Yaron Klein, Raanana (IL); Verly Gafni-Hoek, Kiryat (IL)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,646

(22) Filed: May 23, 2022

(65) Prior Publication Data

US 2022/0283711 A1    Sep. 8, 2022

Related U.S. Application Data

(63) Continuation of application No. 16/858,232, filed on Apr. 24, 2020, now Pat. No. 11,340,793, which is a continuation of application No. 15/908,287, filed on Feb. 28, 2018, now Pat. No. 10,635,324.

(51) Int. Cl.
 *G06F 3/06* (2006.01)
 *G06N 20/00* (2019.01)

(52) U.S. Cl.
 CPC .......... *G06F 3/0614* (2013.01); *G06F 3/0647* (2013.01); *G06F 3/0658* (2013.01); *G06F 3/0688* (2013.01); *G06N 20/00* (2019.01)

(58) Field of Classification Search
 CPC .... G06F 3/0614; G06F 3/0647; G06F 3/0658; G06F 3/0688; G06F 11/3034; G06F 11/3058; G06F 11/3409; G06F 3/0653; G06F 3/0679; G06F 11/0727; G06F 3/0616; G06F 11/07; G06F 11/0751; G06N 20/00; Y02D 10/00

See application file for complete search history.

(56) References Cited

U.S. PATENT DOCUMENTS

| | | | |
|---|---|---|---|
| 9,229,796 | B1 | 1/2016 | Ma et al. |
| 9,569,120 | B2 | 2/2017 | Ryan et al. |
| 9,639,283 | B2 | 5/2017 | Ryan et al. |
| 9,639,284 | B2 | 5/2017 | Ryan et al. |
| 9,645,751 | B2 | 5/2017 | Ryan et al. |
| 10,216,558 | B1 | 2/2019 | Gaber et al. |
| 10,635,324 | B1 | 4/2020 | Klein et al. |

(Continued)

OTHER PUBLICATIONS

Cherdo, Yann, Paul de Kerret, and Renaud Pawlak. "Training lstm for unsupervised anomaly detection without a priori knowledge." ICASSP 2020-2020 IEEE International Conference on Acoustics, Speech and Signal Processing (ICASSP). IEEE, 2020. (Year: 2020).*

(Continued)

*Primary Examiner* — Francisco A Grullon
(74) *Attorney, Agent, or Firm* — Foley & Lardner LLP

(57) ABSTRACT

Various implementations described herein relate to systems and methods for predicting and managing drive hazards for Solid State Drive (SSD) devices in a data center, including receiving telemetry data corresponding to SSDs, determining future hazard of one of those SSDs based on an a-priori model or machine learning, and causing migration of data from that SSD to another SSD.

20 Claims, 5 Drawing Sheets

(56) References Cited

U.S. PATENT DOCUMENTS

| | | | |
|---|---|---|---|
| 2011/0125615 A1 | 5/2011 | Shirbabadi et al. | |
| 2014/0247513 A1 | 9/2014 | Bunker et al. | |
| 2015/0046756 A1 | 2/2015 | Sreekumaran et al. | |
| 2015/0205657 A1* | 7/2015 | Clark | G06F 11/0727 |
| | | | 714/47.3 |
| 2016/0292025 A1 | 10/2016 | Gupta et al. | |
| 2017/0115901 A1 | 4/2017 | Franke et al. | |
| 2017/0124085 A1* | 5/2017 | Khan | G06F 16/955 |
| 2017/0206026 A1 | 7/2017 | Narayanan et al. | |
| 2018/0074973 A1 | 3/2018 | Chan et al. | |
| 2019/0155682 A1 | 5/2019 | Sinha et al. | |
| 2019/0163379 A1 | 5/2019 | Bottan et al. | |
| 2020/0004434 A1* | 1/2020 | Borlick | G06F 11/0727 |
| 2020/0004435 A1* | 1/2020 | Borlick | G06F 3/0653 |

OTHER PUBLICATIONS

Zhao, Zheng, et al. "LSTM network: a deep learning approach for short-term traffic forecast." IET Intelligent Transport Systems 11.2 (2017): 68-75. (Year: 2017).*

"Swordfish Scalable Storage Management API Specification" Swordfish Technical Position Notice, Version 1.0.3 Technical Position, Jan. 24, 2017, pp. 1-114.

Meza et al., "A Large-Scale Study of Flash Memory Failures in the Field", Sigmetrics 15, Jun. 15-19, 2015, 14 pages.

Narayanan et al., "SSD Failures in Datacenters: What? When? and Why?", The Pennsylvania State University, Microsoft Corporation, SYSTOR 16, Jun. 6-8, 2016, Haifa, Israel, 11 pages.

Sujoy Sen and Mohan Kumar, "Intel RSD and NVMe-over-Fabric", Flash Memory Summit 2017, Santa Clara, California, pp. 1-23.

U.S. Office Action on U.S. Appl. No. 16/858,232 dated Sep. 15, 2021.

* cited by examiner

SYSTEM AND METHOD FOR REDUCED SSD FAILURE VIA ANALYSIS AND MACHINE LEARNING

CROSS-REFERENCE TO RELATED APPLICATIONS

The present application is a continuation of U.S. patent application Ser. No. 16/858,232 filed Apr. 24, 2020, which is a continuation of U.S. patent application Ser. No. 15/908,287 filed Feb. 28, 2018, now U.S. Pat. No. 10,635,324, the contents of which are incorporated herein by reference in their entirety.

TECHNICAL FIELD

The present disclosure generally relates generally to systems and methods for improving reliability of Solid State Drives (SSDs) on a system level.

BACKGROUND

SSDs are advanced components having internal controllers that are capable of advanced services. These services include monitoring, logging, and error handling services that provide visibility to non-volatile memory (for example, NAND flash memory) and Flash Translation Layer (FTL) status. The growing density of NAND flash memory and the shift toward triple level cell (TLC) and quadruple level cell (QLC) using 3D lithography pose new challenges to SSDs. These new challenges include but are not limited to, accumulation of bad blocks, high error rate, die failure, etc. Failure to address such challenges causes increased failure rates of SSDs. On the other hand, disaggregation and Software Defined Storage (SDS) promote infrastructure-based architecture managed and orchestrated by a central management entity. For example, Intel®'s Rack Scale Design (RSD) supports pod management of multiple storage devices into virtual volumes that bind to hosts on a rack/pod level.

SUMMARY

In certain aspects, the present implementations are directed to systems and methods for improving reliability of SSDs on a system level by reducing failure overhead through predicting drive failure and migrating data to other drives in advance. In some implementations, a central management device (e.g., a pod manager) may collect SSD telemetry information, for example, by sampling telemetry information from various system level drives, each of which is referred to as an SSD device. The central management device may analyze the SSD telemetry information and detect, based on the analysis, drive failures in advance. The central management device may address the predicted drive failure by, for example, migrating data to other drives and/or preventing the predicted drive failure. In some implementations, an a-priori knowledge base can be implemented to enable prediction of future drive failures based on various types of telemetry information. In some implementations, machine learning can be used predict the future drive failure using prior knowledge of behavior of the SSDs.

DETAILED DESCRIPTION

Among other aspects, Applicant recognizes that vendors densely pack NAND flash memory in storage solutions to reduce costs. Such packing includes adding more bits per cell, using 3 bits (TLC) or 4 bits (QLC) per cell, adding more bits per package (e.g., using 3D lithography), and using smaller form factors (e.g., M.2, Ruler) to pack more drives in an enclosure. Such measures to increase bit and storage form factor density pose new challenges to SSDs. For instance, the cost-cutting measures mentioned above cause an increase in error rate such that stronger Error Correction Codes (ECCs) are needed. In addition, endurance is reduced due to fewer Program/Erase (P/E) cycles being possible. Furthermore, bad blocks can accumulate faster, thus increasing probability of die failure. Still further, temperature sensitivity can be increased, leading to reduced retention.

Further, Applicant observes that the typical SSD data center architecture is moving away from "closed boxes" (e.g., storage appliances) toward disaggregated environments. The concept of disaggregated environments refers to SSDs being disaggregated from an appliance to form a distributed "pool" of storage in which a single storage appliance's software is replaced with a central management device to manage the distributed pool of storage. The central management device can carve out virtual volumes and allocate those virtual volumes from the pool to individual compute nodes. Currently, such allocation is executed based on capacity and reliability, involving Redundant Array of Independent Disks (RAID) and Quality of Service (QoS).

A SSD device or drive can include a controller for the non-volatile memory, typically NAND flash memory, to implement management of the memory, error correction, FTL, wear leveling, garbage collection, and the like. Due to the complexity of the SSDs, the controllers can collect and maintain various parameters reflective of an internal state of the SSDs. In some implementations, telemetry information with respect to SSDs is gathered. Such telemetry information includes but is not limited to, endurance information, ECC information, error rate, utilization information, temperature, workload information, and the like.

Accordingly, implementations described herein are directed to a set of rules and algorithms to address technical issues present in data centers utilizing SSDs. The described implementations reduce SSD failure by detecting hazards and addressing those hazards in advance, thus providing predictive solutions. Due to the numerous types of telemetry data, the amount of processing power needed for analytics, and the amount of telemetry data needed to gain critical mass for accurate analytics, computer modeling and machine learning can be leveraged to address deficiencies in non-computerized analytics. Thus, implementations described herein automate a predictive process not previously automated.

Figure 1:
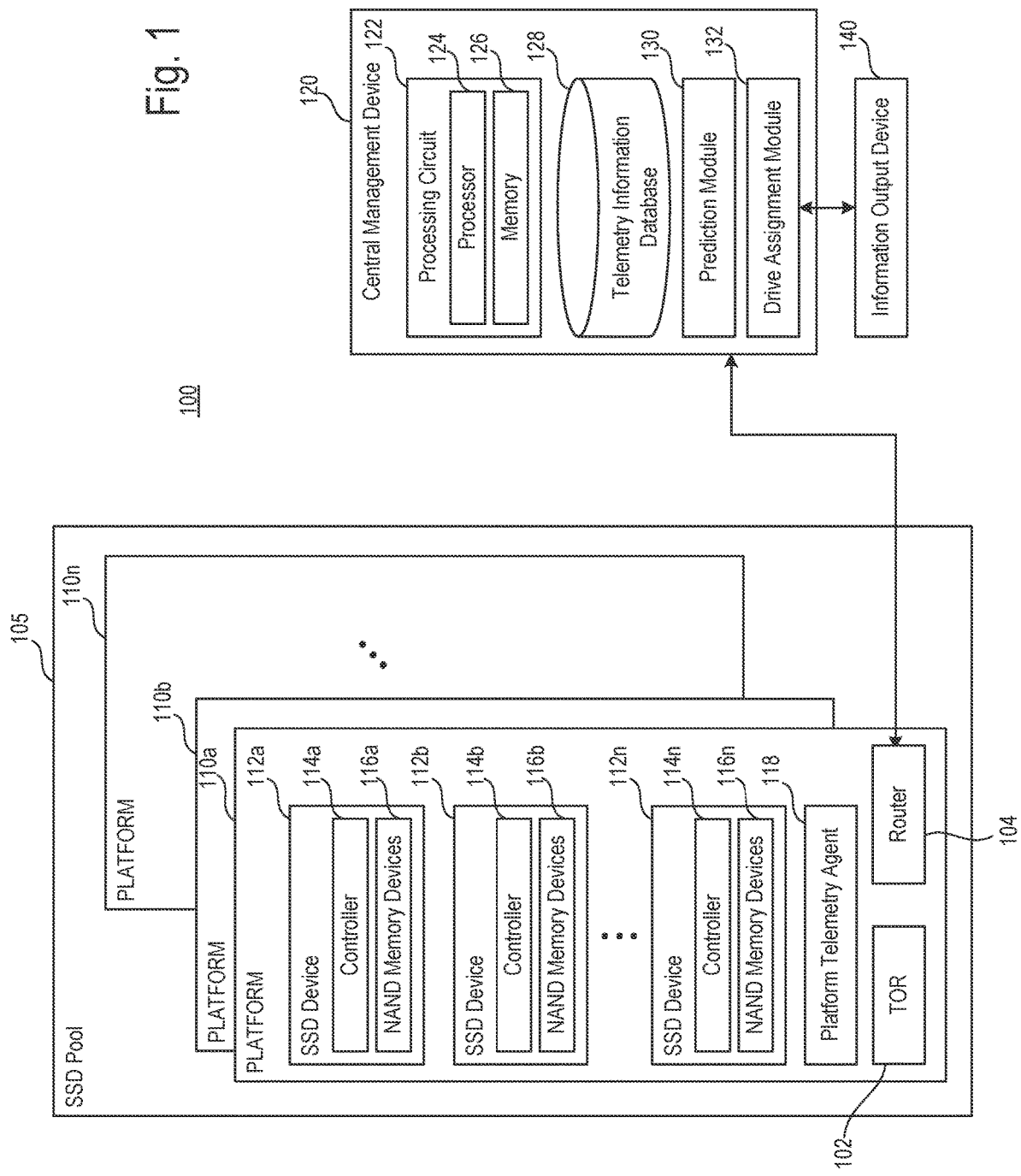
FIG. 1 shows a block diagram of a data center, according to some implementations.

To assist in illustrating certain aspects of the present implementations, FIG. 1 shows a block diagram of a data center 100 according to some implementations. The data center 100 includes a SSD pool 105 having a plurality of platforms 110a-110n. Each of the platforms 110a-110n supports a plurality of SSD devices. For example, the platform 110a supports SSD devices 112a, 112b, ..., and 112n. While features of the platform 110a are described herein for the sake of brevity and clarity, one of ordinary skill in the art can appreciate that the other platforms 110b-110n can be similarly implemented.

The platform 110a may include computer nodes with internal storage, Just a Bunch Of Flash (JBOF) as storage nodes, or both. In some examples, the platform 110a may correspond to at least one rack or pod populated with a plurality of computing nodes (running applications), a plurality of storage devices (maintaining data), or a combination thereof. The computing nodes can run applications such as Non-Structured Query Language (NoSQL) databases. The storage devices can include Non-Volatile Memory (NVM) devices that maintain data, typically NAND flash memory, but examples of other non-volatile memory technologies include, but are not limited to, Magnetic Random Access Memory (MRAM), Phase Change Memory (PCM), Ferro-Electric RAM (FeRAM) or the like. Regardless of whether the platform 110a employs a computer nodes architecture, a JBOF architecture, or both, the platform 110a can serve one or more applications with a given workload using the SSDs 112a-112n.

In some implementations, the SSDs 112a-112n corresponding to the computing nodes and the storage devices within the platform 110a are connected to a Top of Rack (TOR) switch 102 and can communicate with each other via the TOR switch 102 or another suitable intra-platform communication mechanism. In some implementations, at least one router 104 may facilitate communications between the SSDs 112a-112n (corresponding to the computing devices and/or storage devices) in different platforms. Furthermore, the router 104 can facilitate communication between the platform 110a (e.g., the SSD devices 112a-112n) and the central management device 120.

Each of the SSD devices 112a-112n includes a controller 114a, 114b, ..., or 114n, respectively. Each of the SSD devices 112a-112n includes NAND flash memory devices 116a, 116b, ..., or 116n. Although for the sake of brevity and clarity, the SSD device 112a is described, one or ordinary skill in the art can appreciate that other SSD devices 112b-112n can be likewise implemented.

As shown, the SSD device 112a includes the controller 114a and the NAND flash memory devices 116a. The NAND flash memory devices 116a are flash memory and include one or more individual NAND flash dies, which are NVMs capable of retaining data without power. Thus, the NAND flash memory devices 116a refer to a plurality of NAND flash memory devices or dies within the SSD device 112a. The controller 114a can combine raw data storage in a plurality of NAND flash memory devices (collectively referred to herein as the NAND flash memory devices 116a) such that those NAND flash memory devices function like a single drive. The controller 114a can include microcontrollers, buffers, error correction functionality, flash translation layer (FTL) and flash interface modules for implementing such functions. In that regard, the SSD device 112a can be referred to as a "drive."

The controller 114a includes suitable processing and memory capabilities for executing functions described herein. As described, the controller 114a manages various features for the NAND flash memory devices 116a including, but not limited to, I/O handling, reading, writing, erasing, monitoring, logging, error handling, garbage collection, wear leveling, logical to physical address mapping and the like. Thus, the controller 114a provides visibility to the NAND flash memory devices 116a and FTLs associated thereof. Further, the controller 114a can collect telemetry information about the NAND flash memory devices 116a. In some examples, the controller 114a can gather the telemetry information via high-frequency sampling of the NAND flash memory devices 116a. Thus, the controller 114a can serve as a telemetry agent embedded within the SSD device 112a.

Various types of telemetry information can be collected by the controller 114a. Examples of the types of the telemetry information collectable by the controller 114a include, but are not limited to, drive information and data input/output (I/O) workload information. Drive information (also referred to as drive telemetry information or FTL information) includes parameters, data, and values that reflect an internal state of the SSD device 112a. Such drive information can be gathered from an internal FTL counter operatively coupled to or otherwise associated with the SSD device 112a. In that regard, the controller 114a may include the FTL counter. In some implementations, the controller 114a may further include a thermometer for measuring the temperature of the SSD device 112a. As such, the drive information can be determined per drive (e.g., per SSD device). Table 1 illustrates examples of the types of drive information collected by the controller 114a.

TABLE 1

| Parameter | Description |
| --- | --- |
| Erase count | Average erase count of blocks |
| Drive write | Data written to SSD device |
| Media write | Data written to the NAND |
| Utilization | Data utilization of SSD device |
| Bad block count | Number of bad blocks in SSD device |
| BER histogram | Error rate per block |
| ECC state histogram | Number of blocks in each ECC state (algorithm) |
| temperature | SSD device temperature |

As shown in Table 1, examples of the types of drive information include, but are not limited to, erase count, drive write, media write, utilization, bad block count, Bit Error Rate (BER) histogram, ECC state histogram, and temperature. Erase count refers to an average erase count, taking into account all blocks in the NAND flash memory devices 116a. Drive write refers to an amount of data written to the NAND flash memory devices 116a. Media write refers to an amount of data written to a particular one of the NAND flash memory devices 116a. Utilization refers to an amount of data storage capabilities of the NAND flash memory devices 116a that is currently being utilized. Bad block count refers to a number of bad blocks in the NAND flash memory devices 116a. BER histogram refers to an error rate per block. ECC refers to a number of blocks in each ECC state or algorithm. Temperature refers to a temperature of the SSD device 112a.

In some implementations, the drive information can be used to determine various types of drive hazard information of the SSD device 112a, including but not limited to Write Amplification (WA), drive data utilization, wear-out state, and corollary latency. For example, drive data utilization can be deduced from erase count, bad blocks, and BER. Corollary latency can be deduced from the ECC state. Furthermore, endurance information can be a part of the drive hazard information. Given that endurance of the SSD device 112a is reduced with fewer P/E cycles, the endurance information can be determined based on the number of Program/Erase (P/E) cycles (i.e., P/E count). In some examples, the number of P/E cycles can be used as a proxy for endurance information.

Workload information (also referred to as workload profile) includes parameters, data, and values that reflect current read/write data I/O workload of the SSD device 112a. Such workload information can be gathered from a data-path module operatively coupled to or otherwise associated with the SSD device 112a. In that regard, the controller 114a may include the data-path module. Table 2 illustrates examples of the types of workload information collected by the controller 114a.

TABLE 2

| Parameter | Description |
|---|---|
| Read I/O count | Counter of read commands |
| Write I/O count | Counter of write command |
| Total write | Total data written to the drive |
| Total read | Total data read from the drive |
| Write entropy | $H = -\Sigma_{Page}(\text{page}) \cdot \log_2(P(\text{page}))$ (1) |

As shown in Table 2, examples of the types of the workload information include, but are not limited to, read I/O count, write I/O count, total write, total read, and write entropy. The read I/O count refers to a number of read commands executed by the SSD device 112a. The write I/O count refers to a number of write commands executed by the SSD device 112a. The total write parameter refers to a total amount of data written to the SSD device 112a. The total read parameter refers to a total amount of data stored by the SSD device 112a that had been read. Write entropy (H) refers to a degree of randomness in data stored by the SSD device 112a. In expression (1), "page" refers to pages in a block of the NAND flash memory devices 116a.

Such workload information can be used to determine various aspects of the SSD device 112a including, but not limited to, Input/output Operations per second (Tops), internal bandwidth, and randomness.

In addition, the controller 114a may facilitate data migration from the SSD device 112a to another SSD device (e.g., the SSD device 112b) by communicating with an associated controller (e.g., the controller 114b) via the TOR switch 102. Moreover, the controller 114a may facilitate data migration from the SSD device 112a to another SSD device in another platform (e.g., the platform 110b) by communicating with that platform via the router 104.

In some implementations, the platform 110a may include a platform telemetry agent 118 configured to gather the environment information. The environment information (also referred to as platform telemetry information or environment profile) includes parameters, data, and values that reflect a state of hardware components on the platform 110a, including the state of an individual SSD device 112a or chassis (e.g., a JBOF chassis) of the platform 110a. Such environment information can be gathered by a suitable platform, server, rack, or pod management entity. In that regard, the platform telemetry agent 118 may be or may include the platform, server, rack, or pod management entity. Table 3 illustrates examples of the types of environment information collected by the controller 114a.

TABLE 3

| Parameter | Description |
|---|---|
| Temperature | chassis temperature |
| Power | Platform power consumption |

As shown in Table 3, examples of the environment information include, but are not limited to, temperature and power. The environment information can be collected on a per-SSD basis, per-chassis basis, per-JBOF basis, or per-server basis. Temperature refers to the temperature of a SSD. chassis, JBOF, or server associated with the platform 110a. Power refers to the power consumption of the SSD, chassis, JBOF, or server associated with the platform 110a.

The telemetry information is timestamped by the controllers 114a-114n and the platform telemetry agent 118. The controllers 114a-114n and the platform telemetry agent 118 (as well as those from other platforms 110b-110n) are synchronized to a same clock. In some implementations, the telemetry information is sampled periodically (e.g., having a sampling period of 1 hour) to assure detailed information and sufficient sample size.

The router 104 can further facilitate communications between the SSD pool 105 and a central management device 120. For example, the controllers 114a-114n can send the telemetry information (e.g., the drive information and the workload information) to the central management device 120 via the router 104. In addition, the platform telemetry agent 118 can send the telemetry information (e.g., the environment information) to the central management device 120 via the router 104.

The data center 100 further includes the central management device 120. In some implementations, the central management device 120 is a pod manager that manages storage functions for one or more platforms 110a-110n. The central management device 120 may possess considerable computing resources to enable detailed processing of raw telemetry information in order to predict future drive failure, among other technical issues concerning the SSD devices in the SSD pool 105. For example, the central management device 120 includes a processing circuit 122 having a processor 124 and a memory 126.

The processor 124 may include any suitable data processing device, such as but not limited to one or more Central Processing Units (CPUs). In some implementations, the processor 124 can be implemented with one or more microprocessors. In some implementations, the processor 124 may include any suitable electronic processor, controller, microcontroller, or state machine. In some implementations, the processor 124 is implemented as a combination of computing devices (e.g., a combination of a Digital Signal Processor (DSP) and a microprocessor, a plurality of microprocessors, at least one microprocessor in conjunction with a DSP core, or any other such configuration). In some implementations, the processor 124 is implemented as one or more Application Specific Integrated Circuits (ASICs), one or more Field Programmable Gate Arrays (FPGAs), one or more DSPs, a group of processing components, or other suitable electronic processing components.

The memory 126 includes a non-transitory processor-readable storage medium that stores processor-executable instructions executable by the processor 124. In some embodiments, the memory 126 includes any suitable internal or external device for storing software and data. Examples of the memory 126 include but are not limited to, Random Access Memory (RAM), Dynamic RAM (DRAM), Read-Only Memory (ROM), Non-Volatile RAM (NVRAM), flash memory, floppy disks, hard disks, dongles or other Recomp Sensor Board (RSB)-connected memory devices, or the like. The memory 126 can store an Operating System (OS), user application software, and/or executable instructions. The memory 126 can also store application data, such as an array data structure. In some embodiments, the memory 126 stores data and/or computer code for facilitating the various processes described herein.

The central management device 120 may further include a telemetry information database 128 structured to store the telemetry information. Responsive to the telemetry information sampling being complete, the controller 114a-114n and the platform telemetry agent 118 send the telemetry information to the central management device 120. The telemetry data collected with respect to the other platforms 110b and 110n can be likewise sent to the central management device 120. The telemetry information database 128 stores such telemetry information.

The central management device 120 may provision and assign volumes of SSD devices 112a-112n in the platforms 110a-110n in some implementations. For instance, the central management device 120 may include a drive assignment module 132 for provisioning and assigning volumes of SSD devices (e.g., the SSD devices 112a-112n) in the SSD pool 105. In some implementations, the drive assignment module 132 can reassign volumes based on the predicted drive failure determined by a prediction module 130. This constitutes translating the predicted drive failure into actionable directives to be sent back to the SSD pool 105. The drive assignment module 132 can be implemented with the processing circuit 122 or another suitable processing unit.

The central management device 120 further includes the prediction module 130 that predicts failures or other hazards involving the SSD devices 112a-112n in the platforms 110a-110n in advance, before the failures and other hazards occur. In some implementations, the prediction module 130 corresponds to suitable Artificial Intelligence (AI) or machine learning apparatus for generating and tuning a drive model or a fail profile, as well as for automatically predicting future failures and other hazards in advance. The prediction module 130 can be implemented with the processing circuit 122 or another suitable processing unit.

In some implementations, the central management device 120 includes or is otherwise coupled to an information output device 140. For example, the information output device 140 includes any suitable device configured to display information, results, alerts, notifications, messages, and the like to an operator concerning the state of the SSD devices in the SSD pool 105. In some implementations, the information output device 140 includes but is not limited to, a computer monitor, a printer, a facsimile machine, a touchscreen display device, or any other output device performing a similar function.

Various methods can be implemented to predict future hazards using the telemetry information. Examples of such methods include, but are not limited to, a machine-based prediction method and an a-priori-based prediction method.

Figure 2:
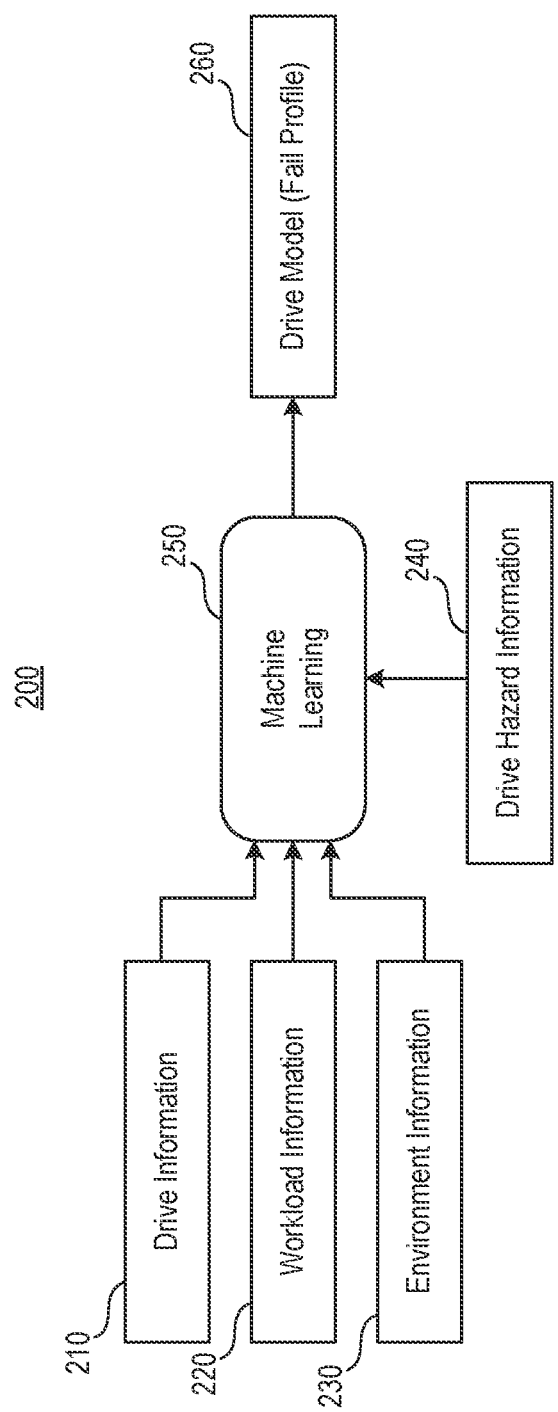
FIG. 2 shows a flow chart of a process for predicting future hazards of a SSD device based on machine learning, according to some implementations.

FIG. 2 illustrates a flow chart of a process 200 for predicting future hazards of a SSD device based on machine learning, according to some implementations. In FIG. 2, blocks with sharp corners denote parameters, data, values, models, and information. Blocks with rounded corners denote processes, operations, and algorithms. Referring generally to the process 200, input parameters/states (e.g., telemetry information 210-230) and disk hazard information 240 are used to derive a drive model 250 or a failure profile using a machine learning process 250 employing AI and machine learning techniques.

As discussed, the platforms 110a-110n can periodically sample the telemetry information and send the telemetry information via the router 104 to the central management device 120, to be stored in the telemetry information database 128. For example, drive information 210 and workload information 220 can be gathered and sent by the controllers 114a-114n with respect to each of the SSD devices 112a-112n, respectively. The drive information 210 and workload information 220 with respect to SSD devices on other platforms 110b-110n can be similarly obtained. Environment information 230 with respect to the platform 110a can be gathered and sent by the platform telemetry agent 118. The environment information 230 with respect to other platforms can be similarly obtained. Such data can be gathered over a long period of time (e.g., a few years) to assure a sufficient sample size for developing the drive model 260.

Drive hazard information 240 refers to actual drive hazards experienced with respect to one or more of the SSD devices 112a-112n as the telemetry information 210-230 is being sampled. The drive hazard information 240 can be derived from the telemetry information 210-230 by the prediction module 130. In some examples, the drive hazard information 240 may include actual drive failures detected by the controllers 114a-114n or another suitable entity residing on the platform 110a. The drive hazard information 240 can be stored in the telemetry information database 128. The drive hazard information 240 includes at least a hazard type, a hazard time, and a device indicator. Examples of the hazard type include, but are not limited to, drive failure, a wear-out state, a WA state, a drive data utilization state, and corollary latency. The hazard time is indicative of the moment in time that the hazard information is determined. The device indicator identifies the SSD device for which the hazard information is determined.

The telemetry information 210-230 and the drive hazard information 240 are used as inputs to a machine learning process 250. The machine learning process 250 determines the drive model 260 based on those inputs. In some implementations, the drive model 260 is assembled using data mining techniques. For example, the machine learning process 250 includes determining correlations between the telemetry information 210-230 and the drive hazard information 240. In one example, the machine learning process 250 involves the prediction module 130 identifying correlations between drive temperature (e.g., as a part of the drive information 210) of a SSD device and a wear-out state of the same SSD device. In another example, the machine learning process 250 involves the prediction module 130 identifying correlations between an actual drive failure of a SSD device and erase count, drive write, media write, utilization, bad block count, BER histogram, ECC state histogram, and temperature of the same SSD device. The sample size may include the telemetry data 210-230 and the drive hazard information 240 collected over a length period of time (e.g., a few years). Accordingly, the drive model 260 is developed by learning from the correlation between actual drive hazard information 240 (e.g., actual drive failures) and the telemetry information 210-230.

The drive model 260 having an input/output paradigm can be thusly developed. The prediction module 130 can receive current telemetry information and input the same into the drive model 260. The drive model 260 can output a predicted drive state. The predicted drive state may indicate that a particular SSD device is functioning normally or is expected to encounter a hazard.

With respect to a detected future hazard, the drive model 260 can output a hazard type and an expected hazard occurrence time. In one example, the detected future hazard may be that in two months, a SSD device will have a number of bad blocks exceeding a safe threshold. In another example, the detected future hazard may be that in six months, a SSD device will have an ECC state that causes latency exceeding a latency threshold for a percentage of blocks in that SSD device, where the percentage exceeds a block threshold. In yet another example, the detected future hazard may be that in a month, there is a probability (beyond a probability threshold) that a SSD device will have a BER that can cause read error.

Figure 3:
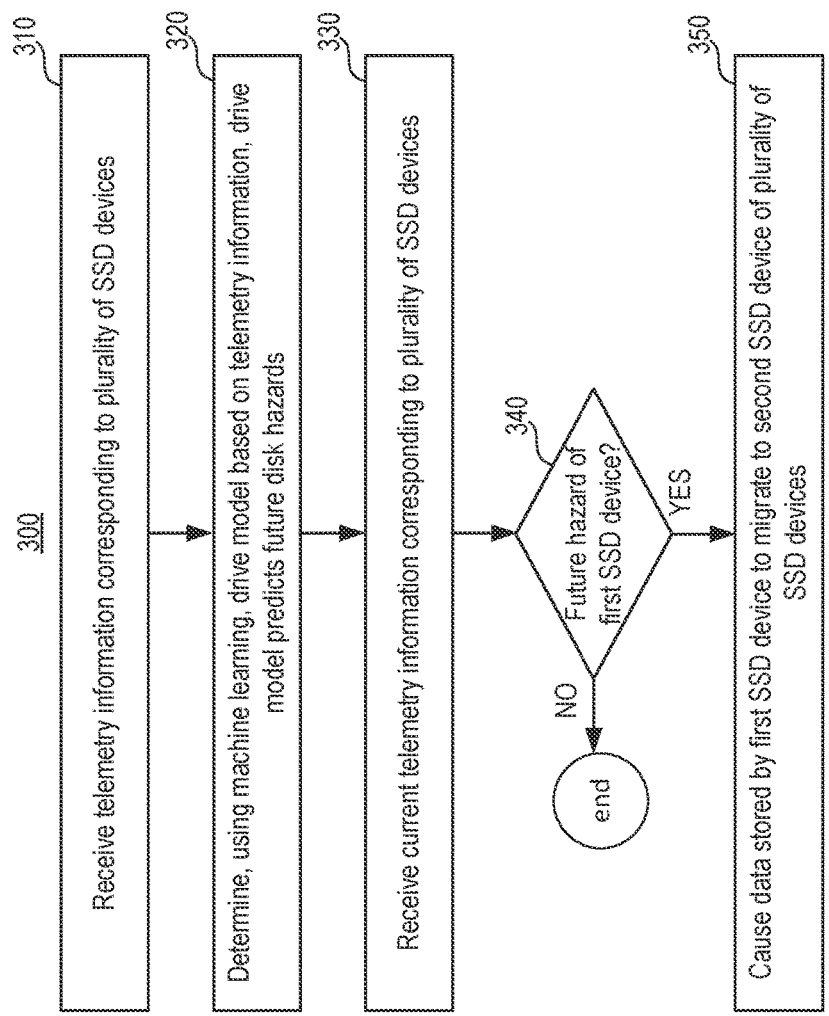
FIG. 3 shows a flow chart of a process for predicting future hazards of a SSD device based on machine learning, according to some implementations.

FIG. 3 shows a flow chart of a process 300 for predicting future hazards of a SSD device based on machine learning, according to some implementations. At 310, the prediction module 130 receives the telemetry information 210-230 corresponding to a plurality of SSD devices. The plurality of SSD devices includes the SSD devices 112a-112n of the platform 110a as well as the SSD devices of the other platforms 110b-110n.

At 320, the prediction module 130 determines, using the machine learning process 250, the drive model 260 based on the telemetry information. The drive model 260 predicts future drive hazards. In some implementations, block 320 includes the prediction module 130 deriving the drive hazard information 240 based on the telemetry information 210-230. The prediction module 130 derives the drive model 260 through machine learning by correlating the telemetry information 210-230 with the drive hazard information 240. Blocks 310 and 320 are periodically iterated as block 310 is executed periodically based on the sampling period. As new telemetry information is received, the drive model 260 may change due to new information that is inputted into the machine learning process 250. The drive model 260 can thusly updated using machine learning.

At 330, the prediction module 130 receives current telemetry information corresponding to the plurality of SSD devices. The current telemetry information may be the same types of telemetry information as that received at block 310. The current telemetry information received at block 330 can be fed back into the machine learning process 250 (e.g., block 320) to update and tune the drive model 260.

At 340, the prediction module 130 determines whether a future hazard is predicted with respect to a first SSD device (e.g., the SSD device 112a) of the plurality of SSD devices. Such determination is made based on the drive model 260 and the current telemetry information. For example, the prediction module 130 can use the current telemetry information as inputs to the drive model 260, to determine whether a future hazard will occur. The future hazard includes a hazard type and an expected hazard occurrence time. Responsive to determining that no future hazard is detect (340:NO), the method 300 ends.

On the other hand, responsive to determining that a future hazard is detected with respect to at least a first SSD device (340:YES), the drive assignment module 132 may cause data stored by the first SSD device to migrate to a second SSD device of the plurality of SSD devices. In some example, the drive assignment module 132 may send a migration command to the router 104, which relays the command to the controller 114a. The controller 114a may send the data stored on one or more of the NAND flash memory devices 116a to another SSD device (e.g., the SSD device 112b) via the TOR switch 102 in some examples. In some examples, the controller 114a may send the data stored on one or more of the NAND flash memory devices 116a to another SSD device on another platform (e.g., the platform 110b) via the router 104.

In addition, or in the alternative to the automated actions in step 350, the prediction module 130 may be configured to cause the information output device 140 to display warnings corresponding to the future hazard of the first SSD device to an operator or administrator so that the operator or administrator can take appropriate action.

Figure 4:
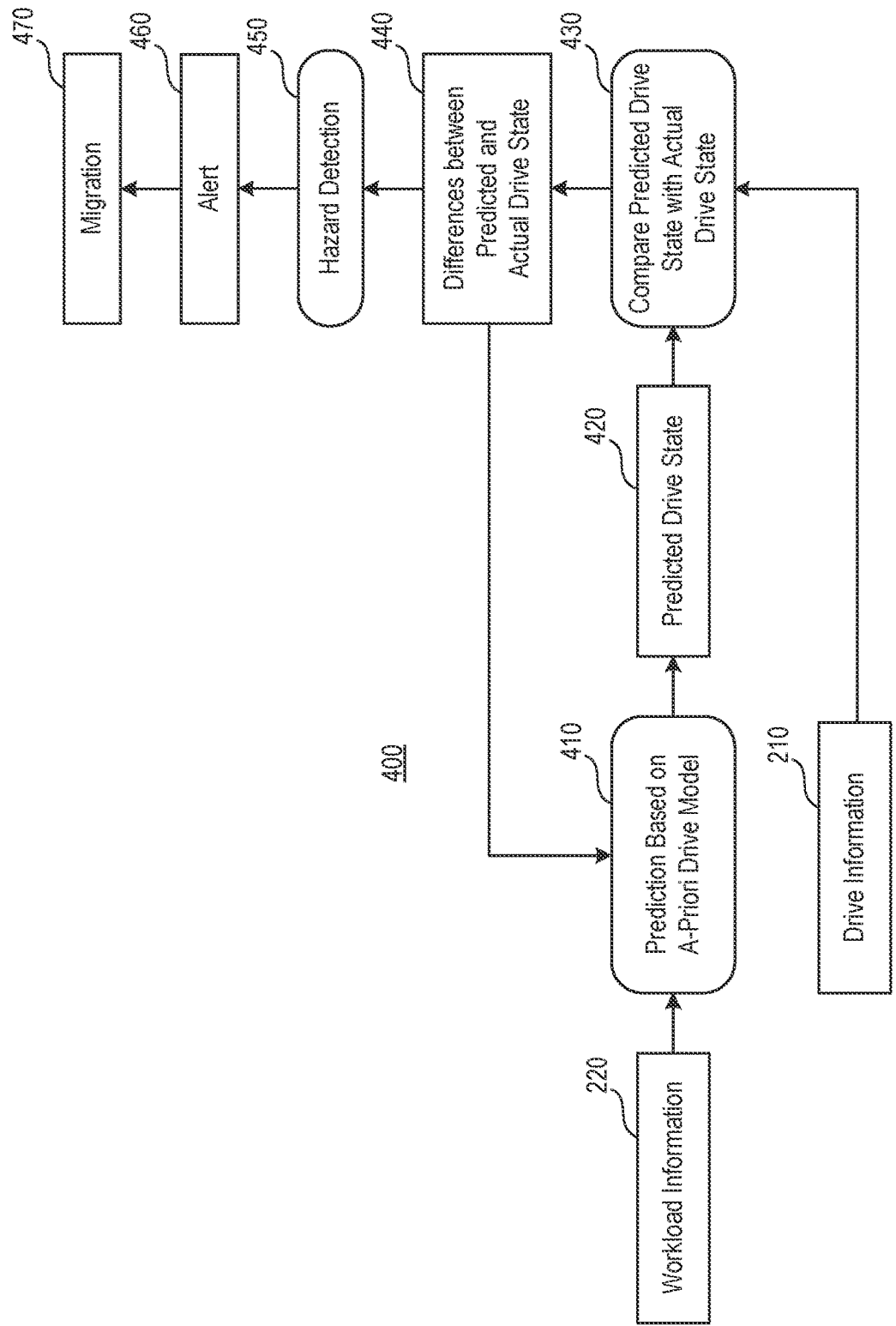
FIG. 4 shows a flow chart of a process for predicting future hazards of a SSD device based on an a-priori model, according to some implementations.

FIG. 4 illustrates a flow chart of a process 400 for predicting future hazards of a SSD device based on an a-priori model, according to some implementations. In FIG. 4, blocks with sharp corners denote parameters, data, values, models, and information. Blocks with rounded corners denote processes, operations, and algorithms. Referring generally to the process 400, an a-priori drive model is used as a starting point to predict a drive state (e.g., a predicted drive state 420) based on the workload information 220. Differences between the predicted drive state 420 and actual drive state (corresponding to the drive information 210) can be used to tune the a-priori drive model and for hazard detection 450. In some implementations, the drive model 260 determined at any moment in time by the prediction module 130 can be used as the a-priori drive model, in a hybrid machine learning and a-priori drive model implementation. Otherwise, the a-priori drive model refers to any suitable model that can determine the predicted drive state 420 using the workload information 220.

In some implementations, the workload information 220 is used as input to block 410 for prediction based on the a-priori drive model, to determine the predicted drive state 420. The predicted drive state 420 includes, in some implementations, the same types of data as the drive information 210. For example, the predicted drive state 420 may include a predicted ECC state histogram or a predicted BER histogram. In some implementations, the predicted drive state 420 includes the same types of data as the drive hazard information. For example, the predicted drive state 420 may include a predicted WA and a predicted P/E count.

The predicted drive state 420 is compared with the drive information 210 received from the SSD pool 105 (and the drive hazard information derived from the drive information 210 by the prediction module 130) at 430. The drive information 210 and the drive hazard information are referred collectively as the actual drive state. Such differences 440 can be derived from model accuracy, drive variance, environment information 230, and the like. For instance, model accuracy can be determined based on internal elements such as Read Disturb. Drive variance can be determined based on NAND flash memory yields.

The actual drive state and the differences 440 between the actual drive state and the predicted drive state can be used as inputs back to the a-priori drive model for first order tuning of the model. In other words, the actual drive state and the differences 440 can facilitate in adapting coefficients present in the a-priori drive model to real world results (e.g., the actual drive state).

The differences 440 can be used for hazard detection 450. For example, when the actual drive state of a SSD device is worse than the predicted drive state 420, it can be assumed that the workload (reflected by the workload information 220) is pushing the SSD device to a failure state. The result of hazard detection 450 can be a detected future hazard, which includes a hazard type and an expected hazard occurrence time. In one example, the detected future hazard may be that in two months, a SSD device will have a number of bad blocks exceeding a safe threshold. In another example, the detected future hazard may be that in six months, a SSD device will have an ECC state that causes latency exceeding a latency threshold for a percentage of blocks in that SSD device, where the percentage exceeds a block threshold. In yet another example, the detected future hazard may be that in a month, there is a probability (beyond a probability threshold) that a SSD device will have a BER that can cause read error.

Responsive to determining the detected future hazard, the information output device 140 can optionally alert an operator at 460, who can decide whether to take action. The information output device 140 can independently, or under instruction from the operator, instruct the drive assignment module 132 can cause migration of the data stored on the SSD device associated with the detected future hazard to evacuate the data, at 470. Alternatively, responsive to determining the detected future hazard, the drive assignment module 132 can directly cause migration of the data stored on the SSD device associated with the detected future hazard to evacuate the data, at 470.

Figure 5:
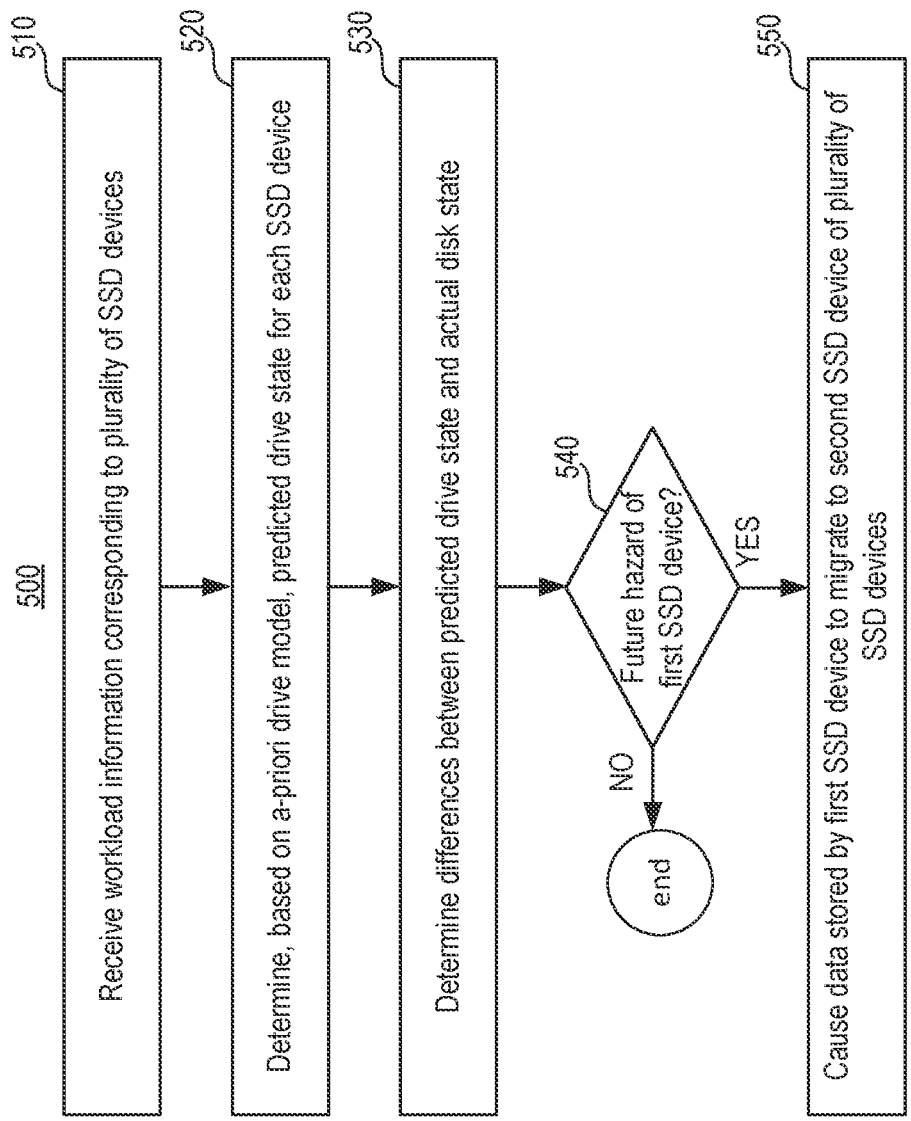
FIG. 5 shows a flow chart of a process for predicting future hazards of a SSD device based on an a-priori model, according to some implementations.

FIG. 5 illustrates a flow chart of a process 500 for predicting future hazards of a SSD device based on an a-priori model, according to some implementations. At 510, the prediction module 130 receives the workload information 220 corresponding to a plurality of SSD devices. The plurality of SSD devices includes the SSD devices 112a-112n of the platform 110a as well as the SSD devices of the other platforms 110b-110n.

At 520, the prediction module 130 determines, based on the a-priori drive model, a predicted drive state 420. At 530, the prediction module 130 determines differences between the predicted drive state 210 and the actual drive state. Block 530 includes the prediction module 130 receiving current drive information 210 corresponding to the plurality of SSD devices. The prediction module 130 can derive the drive hazard information from the drive information 210. The actual drive state includes both the drive information and the drive hazard information.

At 540, the prediction module 130 determines whether a future hazard is predicted with respect to a first SSD device (e.g., the SSD device 112a) of the plurality of SSD devices. Such determination is made based on at least the differences. In some implementations, such determination is based on both the differences and the actual drive state. The future hazard includes a hazard type and an expected hazard occurrence time. Responsive to determining that no future hazard is detect (540:NO), the method 500 ends.

On the other hand, responsive to determining that a future hazard is detected with respect to at least a first SSD device (540:YES), the drive assignment module 132 may cause data stored by the first SSD device to migrate to a second SSD device of the plurality of SSD devices. In some example, the drive assignment module 132 may send a migration command to the router 104, which relays the command to the controller 114a. The controller 114a may send the data stored on one or more of the NAND flash memory devices 116a to another SSD device (e.g., the SSD device 112b) via the TOR switch 102 in some examples. In some examples, the controller 114a may send the data stored on one or more of the NAND flash memory devices 116a to another SSD device on another platform (e.g., the platform 110b) via the router 104.

In addition, or alternatively to the automated actions in step 550, the prediction module 130 may be configured to cause the information output device 140 to display warnings corresponding to the future hazard of the first SSD device to an operator or administrator. The operator or administrator may then take action as required, which may include instructing the drive assignment module via the information output device 140 to perform the migration.

In some implementations, the methods 200(300) and 400(500) can be executed concurrently. When the drive model 260 generated by the machine learning process 250 is deemed to be mature, the a-priori drive model used at 410 can be replaced with the drive model 260. In that regard, the rest of the method 400(500) can remain the same.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A central management device configured to manage a plurality of solid state drive (SSD) devices in a data center, the central management device comprising:
    a prediction module implemented with a processing circuit having a processor and a memory, the prediction module configured to:
        identify drive hazard information;
        identify a drive model that is generated by using machine learning to determine correlations between telemetry information and the drive hazard information, wherein the drive model is configured to predict future drive hazards; and
        determine, based on the drive model and current telemetry information, a future hazard of a first SSD device of the plurality of SSD devices; and
    a drive assignment module that is configured to manage storage of data in the plurality of SSD devices based on determinations by the prediction module.

2. The central management device of claim 1 further comprising a telemetry database that is configured to store the drive hazard information, wherein the prediction module identifies the drive hazard information by accessing the telemetry database.

3. The central management device of claim 1, wherein the telemetry information comprises drive information, data I/O workload information, and environment information.

4. The central management device of claim 3, wherein the drive information comprises at least one of erase count, drive write, media write, utilization, bad block count, Bit Error Rate (BER) histogram, ECC state histogram, and temperature of the plurality of SSD devices.

5. The central management device of claim 3, wherein the data I/O workload information comprises read I/O count, write I/O count, total write, total read, and write entropy of the plurality of SSD devices.

6. The central management device of claim 3, wherein
    the environment information comprises temperature and power consumption of at least one platform supporting the plurality of SSD devices; and
    the environment information is collected by a platform telemetry agent.

7. The central management device of claim 1, wherein
    the plurality of SSD devices are supported by two or more platforms; and
    each of the plurality of SSD devices comprises a controller and one or more NAND flash memory devices.

8. The central management device of claim 7, wherein
    the controller collects the telemetry information with respect to the plurality of SSD devices; and the telemetry information collected by the controller comprises drive information and workload information.

9. The central management device of claim 1, wherein the prediction module identifies the drive model by correlating the telemetry information with the drive hazard information.

10. The central management device of claim 1, wherein the drive assignment module is configured to cause data stored by the first SSD device to migrate to a second SSD device of the plurality of SSD devices automatically responsive to the determination of the future hazard by the prediction module.

11. The central management device of claim 1, wherein the drive assignment module is configured to cause data stored by the first SSD device to migrate to a second SSD device of the plurality of SSD devices as a result of an alert to a user in connection with the determination of the future hazard by the prediction module.

12. A method for managing a plurality of solid state drive (SSD) devices in a data center, the method comprising:
   identifying drive hazard information corresponding to the plurality of SSD devices;
   identifying a drive model that is generated by using machine learning to determine correlations between telemetry information and the drive hazard information, wherein the drive model is configured to predict future drive hazards; and
   determining, based on the drive model and telemetry information, future hazard of a first SSD device of the plurality of SSD devices.

13. The method of claim 12, further comprising:
   causing data stored by the first SSD device to migrate to a second SSD device of the plurality of SSD devices.

14. The method of claim 13, wherein causing data stored by the first SSD device to migrate to the second SSD device is performed automatically responsive to the determination of the future hazard.

15. The method of claim 13, wherein causing data stored by the first SSD device to migrate to the second SSD device is performed as a result of an alert to a user in connection with the determination of the future hazard.

16. A central management device configured to manage a plurality of solid state drive (SSD) devices in a data center, the central management device comprising:
   a prediction module implemented with a processing circuit having a processor and a memory, the prediction module configured to:
      determine, based on an a-priori drive model, data I/O workload information and a current drive state, a predicted drive state for each of the plurality of SSD devices;
      determine differences between the predicted drive state and an actual drive state; and
      update, based on the differences, the a-priori drive model; and
   a drive assignment module that is configured to manage storage of data in the plurality of SSD devices based on determinations by the prediction module.

17. The central management device of claim 16, wherein the drive assignment module is configured to cause data stored by a first SSD device of the plurality of SSD drives to migrate to a second SSD device of the plurality of SSD devices.

18. The central management device of claim 17, wherein the drive assignment module is configured to cause the data stored by the first SSD device to migrate to the second SSD device automatically responsive to determination of a future hazard by the prediction module.

19. The central management device of claim 1, wherein the drive model is configured to:
   obtain as an input at least the telemetry information, and
   provide as an output a predicted drive state, based on the telemetry information received as the input.

20. The central management device of claim 19, wherein the predicted drive state includes a hazard type and an expected hazard occurrence time.

* * * * *